(12) United States Patent
Witt

(10) Patent No.: US 6,554,015 B1
(45) Date of Patent: Apr. 29, 2003

(54) SINGLE PIECE SILVER/PALLADIUM CELL FOR ADJUSTING OR MEASURING A LEVEL OF HYDROGEN AND METHODS THEREFOR

(75) Inventor: R. Christopher Witt, Penn Township, PA (US)

(73) Assignee: The United States of America as represented by the United States Department of Energy, Washington, DC (US)

(*) Notice: Subject to any disclaimer, the term of this patent is extended or adjusted under 35 U.S.C. 154(b) by 45 days.

(21) Appl. No.: 09/928,016

(22) Filed: Aug. 7, 2001

(51) Int. Cl.$^7$ .................................................. B01D 53/22
(52) U.S. Cl. ................................. 137/2; 137/93; 95/56; 96/10; 73/31.07
(58) Field of Search ........................... 37/2, 93; 95/55, 95/56; 96/10, 413, 421; 73/23.2, 31.07

(56) References Cited

U.S. PATENT DOCUMENTS

| | | | | |
|---|---|---|---|---|
| 3,245,206 A | * | 4/1966 | Bonnet | 96/10 |
| 3,312,043 A | | 4/1967 | Sexton | |
| 3,437,357 A | | 4/1969 | Rubin | |
| 3,761,382 A | * | 9/1973 | Hammond et al. | 204/266 |
| 3,791,106 A | * | 2/1974 | Haley | 96/10 |
| 3,975,170 A | * | 8/1976 | Keating, Jr. | 95/23 |
| 4,003,725 A | * | 1/1977 | Bunn et al. | 96/8 |
| RE33,502 E | * | 12/1990 | Gollan | 95/45 |
| 5,034,190 A | * | 7/1991 | Economy et al. | 422/53 |
| 5,376,167 A | | 12/1994 | Broutin et al. | 96/8 |
| 5,498,278 A | * | 3/1996 | Edlund | 96/11 |
| 5,518,530 A | * | 5/1996 | Sakai et al. | 96/11 |
| 5,614,001 A | * | 3/1997 | Kosaka et al. | 96/10 |
| 5,782,960 A | | 7/1998 | Ogawa et al. | 96/11 |
| 5,997,594 A | * | 12/1999 | Edlund et al. | 48/76 |
| 6,461,408 B2 | * | 10/2002 | Buxbaum | 95/55 |

* cited by examiner

Primary Examiner—Michael Powell Buiz
Assistant Examiner—Ramesh Krishnamurthy
(74) Attorney, Agent, or Firm—Julia Cook Moody; Paul A. Gottlieb

(57) ABSTRACT

The invention is directed to a silver/palladium (AgPd) cell for adjusting or measuring a level of hydrogen in a high pressure environment, a high temperature environment, and/or an environment incompatible with stainless steel. The inventive cell includes a hollow diffusion tube of a AgPd alloy operably associated with a hollow connecting member and a connected tube, also operably associated with the hollow connecting member. The cell is operable in environments having a pressure of up to 3,600 p.s.i.

14 Claims, 1 Drawing Sheet

SINGLE PIECE SILVER/PALLADIUM CELL FOR ADJUSTING OR MEASURING A LEVEL OF HYDROGEN AND METHODS THEREFOR

The present invention was conceived and developed under a U.S. Government Contract awarded by the U.S. Department of Energy. The Government has rights in this invention.

FIELD OF THE INVENTION

The present invention is directed to silver/palladium (AgPd) cells. More particularly, the present invention is directed to AgPd cells used for adjusting or measuring a level of hydrogen in a high pressure environment, a high temperature environment and/or an environment incompatible with stainless steel. The present invention is also directed to methods of using such cells.

BACKGROUND

One of the properties of palladium is its ability, at room temperature, to absorb up to 900 times its own volume of hydrogen. This unique property has made palladium useful in controlling and monitoring hydrogen. Of special interest is the ability to use palladium as a hydrogen diffusion membrane across a pressure boundary. Silver-palladium (AgPd) cells have been manufactured for this purpose. By controlling the partial pressure of hydrogen in the AgPd cell external to the pressure boundary, it is possible to control the hydrogen levels inside a pressure boundary. A higher partial pressure of hydrogen on the exterior will allow diffusion of hydrogen across the AgPd cell and into a pressure vessel until equilibrium is achieved. Conversely, a lower partial pressure of hydrogen on the exterior side will allow hydrogen to "vent" across the pressure boundary and into the pressure vessel. The AgPd cell can also be used to monitor hydrogen levels within a pressure vessel. A vacuum is pulled on the exterior of the AgPd cell. As hydrogen diffuses through the AgPd cell, the pressure on the exterior of the cell will reach an equilibrium. From a pressure reading from the inside of the cell, the hydrogen level within the pressure boundary can be calculated. While existing AgPd cells have been used to both control and monitor hydrogen levels across a pressure boundary, there are operational limitations on their usage.

One prior art AgPd cell consists of a thin 25% Ag/75% Pd tube supported internally by a cylindrical stainless steel "sponge." One end of the tube is sealed by brazing on a 304 stainless steel end cap. The other end of the tube is brazed onto a 304 stainless steel Swagelok fitting. The use of stainless steel unsatisfactorily limits the environments in which AgPd cells can be used. For example, a caustic environment might corrode stainless steel if such a cell were used.

Another prior art AgPd cell consists of a 20% Ag/80% Pd tube with a welded end. This tube has only a 0.060 inch thickness and is rated to withstand pressures of up to only 2,000 p.s.i. This pressure rating unsatisfactorily limits the environments in which this prior art cell may be used. Attempts to manufacture an operable AgPd tube with a greater wall thickness have been unsuccessful.

Those skilled in the art will recognize that there is a need for a AgPd cell with improved operating characteristics, as well as a need for methods using such a AgPd cell. A further need in the art is a AgPd cell that is operable at higher pressures and/or higher temperatures, as well as a need for methods using such a AgPd cell. A still further need in the art is a AgPd cell that is operable in environments that are incompatible with stainless steel, as well as a need for methods using such a AgPd cell.

SUMMARY OF THE INVENTION

It is therefore a primary object of the invention to provide a AgPd cell and methods of measuring or adjusting a level of hydrogen that meet these needs in the art.

I have discovered that one or more of these needs is met by a AgPd cell comprising a hollow diffusion tube made of a AgPd alloy, a hollow connecting member having first and second ends, and a hollow connecting tube. The diffusion tube has a closed end and an open end. The first end of the hollow connecting member is operably associated with the open end of the hollow diffusion tube. The hollow connecting tube is operably associated with the second end of the hollow connecting member. The cell is operable at pressures up to and including about 3,600 p.s.i.

A AgPd cell, according to another aspect of the invention, comprises a hollow diffusion tube made of a AgPd alloy, a hollow connecting member having first and second ends, and a hollow connecting tube. The diffusion tube has a closed end and an open end. The first end of the hollow connecting member is operably associated with the open end of the hollow diffusion tube. The hollow connecting tube is operably associated with the second end of the hollow connecting member. The cell is operable at pressures up to and including about 2,600 p.s.i. and at temperatures up to and including about 338 degrees Celsius.

A AgPd cell, according to another aspect of the invention, comprises a hollow diffusion tube made of a AgPd alloy, a hollow connecting member having first and second ends, and a hollow connecting tube. The diffusion tube has a closed end and an open end. The first end of the hollow connecting member is operably associated with the open end of the hollow diffusion tube. The hollow connecting tube is operably associated with the second end of the hollow connecting member. The cell is operable at a hollow diffusion tube wall thickness greater than 0.060 inches and less than or equal to 0.089 inches.

A method of measuring a level of hydrogen in an environment outside a AgPd cell, according to another aspect of the invention, comprises the following steps. A AgPd cell is provided. A level of hydrogen in an environment outside the AgPd cell is measured by allowing hydrogen to diffuse into or out of the AgPd cell, wherein the environment has a pressure up to and including 3,600 p.s.i. The AgPd cell comprises a hollow diffusion tube, a hollow connecting member, a hollow connecting tube, and a pressure sensor for measuring a level of hydrogen. The hollow diffusion tube is made of a AgPd alloy and has a closed end and an open end. The hollow connecting member has first and second ends, wherein the first end is operably associated with the open end of the hollow diffusion tube. The hollow connecting tube is operably associated with the second end of the hollow connecting member. The pressure sensor is operably associated with the hollow connecting tube.

A method of adjusting a level of hydrogen in an environment outside a AgPd cell, according to yet another aspect of the invention, comprises the following steps. A source of hydrogen is provided. A AgPd cell is provided. The level of hydrogen in an environment outside the AgPd cell is increased or decreased by increasing or decreasing the level of hydrogen from the hydrogen source to the AgPd cell, wherein the environment is at a pressure up to and including about 3,600 p.s.i. The AgPd cell comprises a hollow diffusion tube, a hollow connecting member, and a hollow connecting tube. The hollow diffusion tube is made of a AgPd alloy and has a closed end and an open end. The hollow connecting member has first and second ends, wherein the first end is operably associated with the open end of the hollow diffusion tube. The hollow connecting tube is operably associated with the second end of the hollow connecting member.

DETAILED DESCRIPTION

Figure 1:
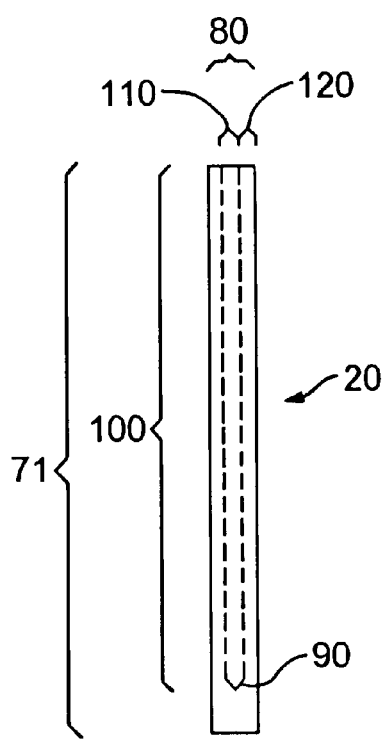
FIG. 1 is a plan view of the hollow diffusion tube of the AgPd cell with dashed lines indicating hidden features.

I have discovered that hydrogen levels in a high pressure environment, high temperature environment, and/or an environment incompatible with stainless steel may be measured or adjusted by the inventive AgPd cell. The inventive cell comprises a hollow diffusion tube connected without welding or brazing to a hollow connecting tube via a hollow connecting member. Direct connection between the hollow diffusion tube and hollow connecting member, and/or between the hollow connecting member and the connecting tube is not essential to the invention. For example, ferrules, gaskets, and the like may be used in between each of these two connections. The connecting tube allows connection of the cell to a source of hydrogen, a pressure regulator, a pressure sensor, and/or other instrumentation involved in the measuring, testing or adjusting of hydrogen in an environment. In order to more accurately measure or adjust the hydrogen level in a chamber containing the environment, the inventive cell may be used with a sealing member that provides a gas-tight seal at the interface of the inventive cell and the chamber. If a sealing member is used, the sealing member may also be used to connect the hollow connecting tube to another hollow connecting tube outside the chamber.

The hollow diffusion tube is made of a AgPd alloy which permits the diffusion of hydrogen across the walls of the tube to and from an environment outside the cell. The tube is preferably cast from the alloy. The palladium in the alloy has excellent hydrogen absorption and diffusion properties that render it quite suitable as a material for a hydrogen diffusion membrane across a pressure boundary. Gases other than hydrogen are not nearly so readily absorbed and diffused by the AgPd alloy. Hence, when the AgPd alloy is used as a hollow diffusion tube, selective diffusion of substantially only hydrogen is achieved. Superior results may be obtainable when the alloy contains substantially 20% Ag and 80% Pd (by weight).

The hollow diffusion tube also has a sufficient thickness and strength that allow the inventive cell to be used in high pressure environments and/or high temperature environments where prior art cells fail due to leaks or ruptures. When a hollow diffusion tube wall thickness of about 0.089 inches is employed, the cell may be used in environments having a pressure of up to 3,600 p.s.i., and in environments having a pressure of up to 2,600 p.s.i. at a temperature of up to 338 degrees Celsius.

I have also discovered that the cell may be used in environments incompatible with stainless steel, such as caustic environments. Because the cell has no stainless steel components, such environments will not corrode, react with, or otherwise diminish the quality of the cell. Additional benefits in such environments may be achieved by using a hollow connecting member made of a material consisting essentially of either nickel metal, or an alloy containing a majority of nickel. Suitable nickel alloys include those used in the AgPd cell art. A particularly suitable nickel alloy is Inconel™, a family of nickel-based alloys also containing minor amounts of chromium and iron.

Figure 2:
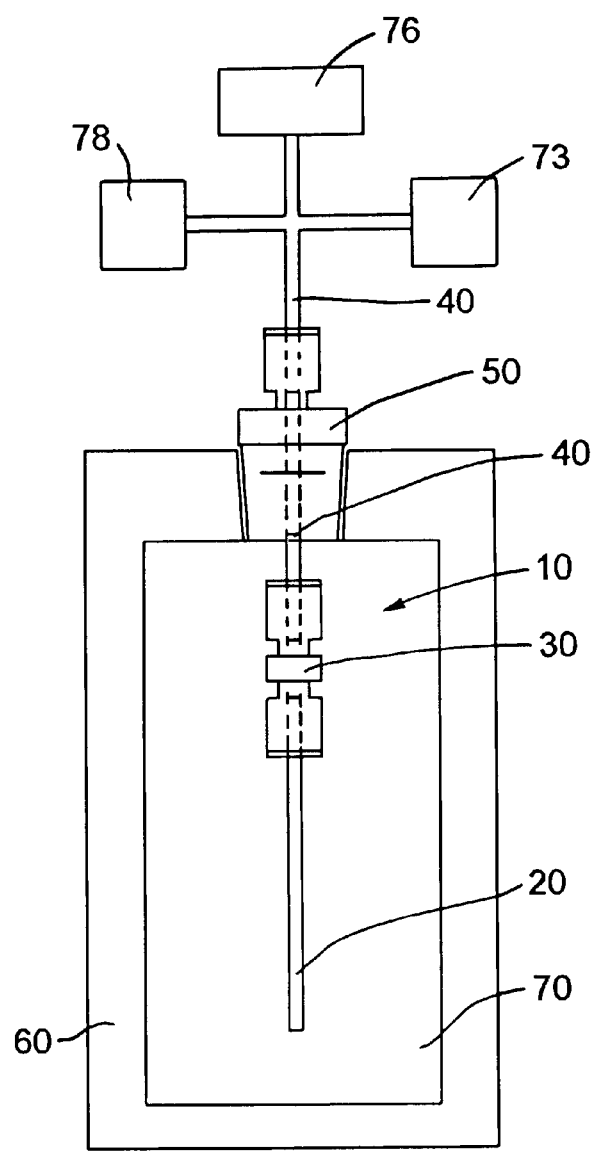
FIG. 2 is a plan view of the AgPd cell in an autoclave with dashed lines indicating hidden features.

As best shown in FIG. 2, an embodiment of the inventive AgPd cell 10 has a hollow diffusion tube 20, a hollow connecting member 30, and first and second sections of hollow connecting tubes 40. Suitable hollow connecting members 30 include Swagelok unions. The cell 10 is used in a chamber 60 containing an environment 70 to be measured or adjusted. A sealing member 50 seals the site at which the first section of hollow connecting tube 40 of the cell 10 interfaces with the chamber 60 and the second section of hollow connecting tube 40, in order to prevent leaks and to provide greater accuracy in measurement and/or adjustment. Suitable sealing members include Swagelok connectors.

Again referring to FIG. 2, the inventive cell 10 may be used to measure a level of hydrogen in the environment 70 as follows. A pump 73 is used to pull a vacuum in the cell 10. Then hydrogen is allowed to diffuse into the cell 10 from the environment 70. Once diffusion of hydrogen in and out of the cell has reached equilibrium, the partial pressure of hydrogen within the cell will be equal to the partial pressure of hydrogen within the environment 70. After equilibrium is achieved, the pressure sensor 78 is used to measure the partial pressure of hydrogen inside the cell 10. Those skilled in the art will appreciate that this sensed pressure may be used to calculate the level of hydrogen inside the environment 70.

Again referring to FIG. 2, the inventive cell 10 may be used to adjust a level of hydrogen in the environment 70 as follows. In order to decrease the level of hydrogen in the environment 70, a pump 73 is used to pull a partial vacuum in the cell 10. Hydrogen from within the environment 70 is allowed to diffuse across the pressure boundary of the cell 10 until an equilibrium is reached and the partial pressures of hydrogen within and outside the cell 10 equalize. The level of hydrogen within the environment 70 is thus decreased.

Again referring to FIG. 2, the cell 10 may be used to increase the level of hydrogen in the environment 70. A regulated hydrogen source 76 is adjusted in order to introduce hydrogen into the cell 10. Hydrogen from within the cell 10 is then allowed to diffuse across the pressure boundary of the cell 10 until an equilibrium is reached and the partial pressures of hydrogen within and outside the cell 10 equalize. The level of hydrogen in the environment 70 is thus increased.

As best illustrated in FIG. 1, the hollow diffusion tube 20 is made of 20% Ag and 80% Pd and has a overall length 71 of preferably 3.00 to 6.00 inches and a diameter 80 of 0.250 inches. The hollow diffusion tube 20 has a hole with a length 100 of 5.50 inches and a diameter 110 of 0.072 inches, yielding a hollow tube wall thickness 120 of 0.089 inches. The hollow diffusion tube 20 has a cylindrical hole concentric with the tube's axis and a tapered bottom 90. The hollow diffusion tube 20 may be manufactured by drilling a hole in a solid rod of the AgPd alloy. Those skilled in the art will appreciate that the rod may be made by well known methods other than casting.

The inventive cell 10 has been pressure tested up to 3,600 p.s.i. The cell 10 has also been successfully used in environments with a pressure of 2,600 p.s.i. and a temperature of 338 degrees Celsius.

Having thus described the invention, it will be realized that although the foregoing description of the inventor's preferred embodiment includes specific quantities, materials and procedures, modifications and variations thereof might be employed without departing from the inventive concept herein.

I claim:

1. A AgPd cell for adjusting or measuring a level of hydrogen in an environment outside said cell, said cell comprising:
   a) a hollow diffusion tube made of a AgPd alloy, said diffusion tube having a closed end and an open end;
   b) a hollow connecting member having first and second ends, said first end being operably associated with said open end of said hollow diffusion tube; and
   c) a hollow connecting tube operably associated with said second end of said hollow connecting member, wherein said cell is operable at pressures up to and including about 3,600 p.s.i.

2. The AgPd cell as in claim 1, wherein said AgPd alloy consists essentially of about 20% Ag and 80% Pd by weight.

3. The AgPd cell as in claim 2, wherein the wall of said hollow diffusion tube has a thickness greater than 0.060 inches and less than or equal to 0.089 inches, such that said AgPd cell is operable at pressures up to and including about 2,600 p.s.i. and at temperatures up to and including about 338 degrees Celsius.

4. The AgPd cell as in claim 1, wherein said AgPd cell is weld-free and brazing-free.

5. The AgPd cell as in claim 2, wherein said AgPd cell is weld-free and brazing-free.

6. The AgPd cell as in claim 3, wherein said AgPd cell is weld-free and brazing-free.

7. The AgPd cell as in claim 1, wherein said hollow connecting member is made of nickel or an alloy having a majority of nickel, and said cell is operable in environments incompatible with stainless steel.

8. The AgPd cell as in claim 2, wherein said hollow connecting member is made of nickel or an alloy having a majority of nickel, and said cell is operable in environments incompatible with stainless steel.

9. The AgPd cell as in claim 3, wherein said hollow connecting member is made of nickel or an alloy having a majority of nickel, and said cell is operable in environments incompatible with stainless steel.

10. The AgPd cell as in claim 4, wherein said hollow connecting member is made of nickel or an alloy having a majority of nickel, and said cell is operable in environments incompatible with stainless steel.

11. The AgPd cell as in claim 2, wherein said hollow diffusion tube has a length greater than or equal to 3.00 inches and less than or equal to 6.00 inches, an outer diameter of about 0.250 inches and an inner diameter of about 0.072 inches, and a bore defined by said inner diameter, said bore having a length of about 5.50 inches.

12. The AgPd cell as in claim 7, wherein said bore has a tapered bottom.

13. A method of measuring a level of hydrogen in an environment outside a AgPd cell, comprising the steps of:
   a) providing the AgPd cell comprising
      i) a hollow diffusion tube made of AgPd alloy, said diffusion tube having a closed end and an open end,
      ii) a hollow connecting member having first and second ends, the first end being operably associated with the open end of the hollow diffusion tube, and
      iii) a hollow connecting tube operably associated with the second end of the hollow connecting member,
      iv) a pressure sensor for measuring a level of hydrogen, the pressure sensor operably associated with the hollow connecting tube; and
   b) measuring a level of hydrogen in an environment outside the AgPd cell by allowing hydrogen to diffuse into or out of the AgPd cell, wherein the environment has a pressure up to and including 3,600 p.s.i.

14. A method of adjusting a level of hydrogen in an environment outside a AgPd cell, comprising the steps of:
   a) providing the AgPd cell comprising
      i) a hollow diffusion tube made of AgPd alloy, said diffusion tube having a closed end and an open end,
      ii) a hollow connecting member having first and second ends, the first end being operably associated with the open end of the hollow diffusion tube, and
      iii) a hollow connecting tube operably associated with the second end of the hollow connecting member,
      iv) a pressure sensor for measuring a level of hydrogen, the pressure sensor operably associated with the hollow connecting tube; and
   b) measuring a level of hydrogen in an environment outside the AgPd cell by allowing hydrogen to diffuse into or out of the AgPd cell, wherein the environment has a pressure up to and including 3,600 p.s.i.
   c) increasing or decreasing the level of hydrogen in an environment outside the AgPd cell by increasing or decreasing the level of hydrogen from a regulated hydrogen source to the AgPd cell, wherein the environment is at pressures up to and including about 3,600 p.s.i.

* * * * *